United States Patent Office 3,509,129
Patented Apr. 28, 1970

3,509,129
ADENOSINE DERIVATIVES
Wolfgang Kampe, Heddesheim, Max Thiel, Mannheim, and Kurt Stach, Wolfgang Schaumann, and Karl Dietmann, Mannheim-Waldhof, Germany, assignors to C. F. Boehringer & Soehne G.m.b.H., Mannheim-Waldhof, Germany
No Drawing. Filed Apr. 16, 1968, Ser. No. 721,608
Claims priority, application Germany, June 8, 1967, B 92,909
Int. Cl. C07d 51/54; A61k 27/00
U.S. Cl. 260—211.5
7 Claims

ABSTRACT OF THE DISCLOSURE

A series of novel adenosine derivatives possessed of hemodyanamic and coronary dynamic activity and constituting particularly effective coronary dilating agents characterized by the formula:

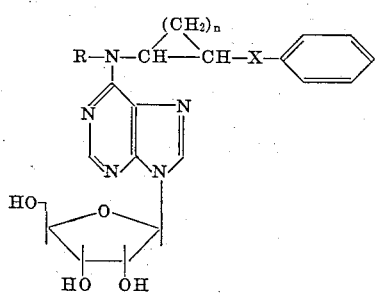

wherein R is hydrogen or lower alkyl, X is a valency bond or oxygen and $n$ is a whole number having a value of from 1 to 5.

The present invention relates to adenosine derivatives, to therapeutic compositions containing such adenosine derivatives as active ingredient and to methods of preparing and using such derivatives and compositions.

More particularly this invention relates to adenosine derivatives having the formula:

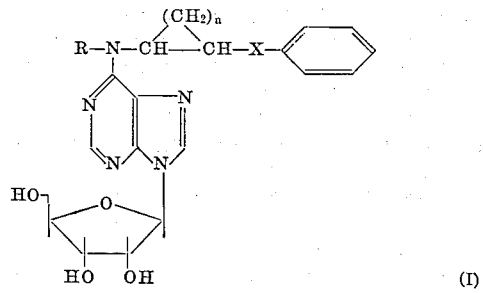

wherein R is hydrogen or lower alkyl, X is a valency bond or oxygen and $n$ is a whole number having a value of from 1 to 5.

The adenosine derivatives according to the present invention are possessed of hemodyanamic and coronary dynamic activity and are particularly effective as coronary dilators.

The novel adenosine derivatives according to the present invention can be prepared, for example, by reacting a 6-halo-purinriboside of the formula:

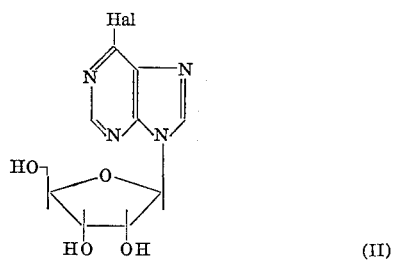

wherein Hal is halogen, with an amine of the formula:

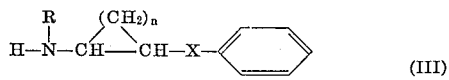

wherein R, X and $n$ are as defined above. If desired, the hydroxyl groups of the ribose residue can be temporarily blocked by groups which can thereafter be easily split off following completion of the condensation reaction.

As starting materials, it is preferred to use the 6-chloro- and 6-bromo-purine ribosides (II). Compounds of this type are described, for example, in Coll. Czech. Chem. Comm., 30, 1880/1965 and in Biochemical Preparations, 10, 148/1963.

In carrying out the preparation of the new compounds according to the present invention, the reaction components are advantageously heated in a suitable inert solvent, preferably in a high boiling point alcohol, such as isopropanol, n-propanol or butanol, or in tetrahydrofuran. However, the reaction mixture can be also allowed to stand for several days at ambient temperature if an equimolar amount of a tertiary amine, preferably of triethylamine, is added.

If it is desired to temporarily block the hydroxyl groups in the starting materials (II), then there are used the protective groups which are conventional in sugar chemistry. For this purpose, there can be used acyl groups, preferably acetyl or benzoyl groups, or ketals are employed, such as the 2′,3′-isopropylidene compounds, which, after the condensation reaction has taken place, can easily be converted into the desired 2′,3′-dihydroxy compounds by the action of acids. However, when acyl groups are used as protective groups, these are split off under alkaline conditions.

The following examples are given for the purpose of illustrating the present invention and are in nowise to be construed as a limitation thereof.

EXAMPLE 1

N(6)-(2-phenyl-cyclopropyl)-adenosine 4.1 g. triacetyl-6-chloro-9-($\beta$-D-ribofuranosyl)-purine, 2.0 g. 2-phenyl-cyclopropylamine and 2.0 g. triethylamine were boiled under reflux for 2 hours in 50 ml. isopropanol. The resulting reaction mixture was then evaporated under vacuum and the residue taken up with ether and water. The ethereal phase was washed twice with water, then dried and evaporated. This residue was taken up in 50 ml. methanol which had been saturated with ammonia. The reaction mixture was allowed to stand overnight and then evaporated in a vacuum and the residue recrystallized from ethanol, with the addition of some isopropanol. There were thusly obtained 1.8 g. (47% of theory) N(6)-(2-phenyl-cyclopropyl)-adenosine, having a melting point of 136–138° C.

EXAMPLE 2

N(6)-(2-phenoxy-cyclopropyl)-adenosine

Following a procedure analogous to that described in Example 1, there were obtained from 4.1 g. triacetyl-6-chloro-9-(β-D-ribofuranosyl)-purine, 2.2 g. 2-phenoxy-cyclopropylamine and 2.02 g. triethylamine, a crude product which was recrystallized from a little methanol with the addition of activated charcoal. There were thereby recovered 1.5 g. (37% of theory) N(6)-(2-phenoxy-cyclopropyl)-adenosine having a melting point of 123–126° C.

EXAMPLE 3

N(6)-(2-phenyl-cyclohexyl)-adenosine

Using a method analogous to that described in Example 1, and starting from 4.1 g. triacetyl-6-chloro-9-(β-D-ribofuranosyl)-purine, 2.7 g. 2-phenyl-cyclohexylamine and 2.02 g. triethylamine, there was obtained a crude product which was purified by preparative thin layer chromatography on silica gel plates (chloroform/methanol 6:1). The product was then eluted from the silica gel with chloroform/methanol (1:1) and the eluate evaporated in a vacuum. The solid, foamy residue which was recovered was triturated with ligroin, filtered off with suction and dried. There were thusly recovered 2.2 g. (51% of theory) non-crystalline N(6)-(2-phenyl-cyclohexyl)-adenosine having a melting point of 103–105° C.

EXAMPLE 4

N(6)-(2-phenyl-cyclopentyl)-adenosine

By a method analogous to that described in Example 1, starting from 4.1 g. triacetyl-6-chloro-9-(β-D-ribofuranosyl)-purine, 2.4 g. 2-phenyl-cyclopentylamine and 2.02 g. triethylamine, there was obtained a crude product which was purified according to the produre described in Example 3. There were thusly obtained 2.5 g. (61% of theory) N(6)-(2-phenyl-cyclopentyl)-adenosine having a melting point of 102–104° C.

EXAMPLE 5

N(6)-(trans-2-phenyl-cyclohexyl)-adenosine

A solution 4.1 g. triacetyl-6-chloro-9-(β-D-ribofuranosyl)-purine, 2.7 g. trans-2-phenyl-cyclohexylamine and 1.55 g. triethylamine in 45 ml. anhydrous tetrahydrofuran was allowed to stand for 3 days at ambient temperature. The reaction mixture was then evaporated in a vacuum and the residue taken up in benzene and water. The benzene phase was washed twice with water, dried and evaporated. The recovered residue was dissolved in 30 ml. methanol and, following the addition of 2 ml. 1 N sodium methylate solution, boiled under reflux for 15 minutes. The solution was then neutralized and evaporated. The brown residue which formed was suspended in hot water and this suspension mixed with methanol until all of the residue had completely dissolved. The hot solution was then clarified with acitvated charcoal and evaporated as completely as possible in a vacuum. The remaining syrup was dissolved in 20–30 ml. ethyl acetate and the product precipitated out of the solution by the dropwise addition of ligroin. Following filtering off and drying, there were obtained 2.1 g. (50% of theory) N(6) - (trans - 2-phenyl-cyclohexyl)-adenosine. After recrystallization from water/methanol, the recovered compound melted at 138–140° C.

EXAMPLE 6

N(6)-(trans-2-phenyl-cyclopentyl)-adenosine

A solution of 6.2 g. triacetyl-6-chloro-9-(β-D-ribofuranosyl)-purine, 3.6 g. trans-2-phenyl-cyclopentylamine and 3.0 g. triethylamine in 50 ml. isopropanol was allowed to stand for 2 days at ambient temperature. The reaction mixture was thereafter worked according to the method described in Example 5. The crude product which was obtained was chromatographed in a silica gel column with chloroform/methanol (95.5). The recovered fractions containing the desired product, but some of which were still colored yellow to brown, were combined and evaporated. The residue was then treated by a procedure analogous to that described in Example 5, with activated charcoal, again evaporated, taken up with ethyl acetate and precipitated out by the dropwise addition of ligroin, while stirring vigorously. There were thereby recovered 2.0 g. (33% of theory) non-crystalline N(6)-(trans-2-phenylcyclopentyl)-adenosine having a melting point of 118–120° C. (decomp.).

In order to establish the effectiveness of the compounds in accordance with the invention as therapeutic agents exerting an effect on the cardiac and circulatory systems, and in particular that the N(6)-cycloalkyl substituted adenosine derivatives of the invention are possessed of vasodilating activity associated with a pronounced coronary specificity, the applicants carried out a series of tests, the details and significance of which are set out hereinafter.

Adenosine on intravenous administration in mammals and humans produces a vaso-dilation. In particular this effect is noticeable in the coronary vascular system wherein a marked increase in blood circulation results from the vaso-dilation produced by administration of adenosine (Berne, Blackmon and Gardner, J. clin. Invest. 36, 1101 [1957]). However, due to the rapid deamination of adenosine, this effect is only transient. The N(6)-substituted derivatives of adenosine in accordance with the invention have been found to exert a marked coronary vasodilating effect of high specificity but in contrast to adenosine, the effect is a prolonged one. In order to compare the effectiveness of the novel N(6)-substituted adenosine derivatives, on the coronary blood circulation, the applicants have selected N-(6)-methyl-adenosine which has been described in the literature (Bredereck, Haas u. Martini, Chem. Ber. 81, 307 [1948]) and N(6)-benzyl-adenosine described by Kissman and Weiss, J. Org. Chem. 21, 1053 (1956) as the comparison compounds.

An increased blood circulation in the coronary system, provided that there are no significant changes in the myocardial oxygen consumption, results in a reciprocal decrease of the coronary arteriovenous oxygen difference. This decrease in extraction of oxygen from the blood leads to an additional supply of oxygen and namely, that an improvement in the oxygen supply to the myocardium which is the ultimate aim sought to be achieved with all coronary dilating agents.

For the purpose of obtaining an exact basis for evaluating the results of the procedures involved, the decrease in coronary arteriovenous oxygen difference (at the time of the maximum effect) has been reported in volume percent in the table as compared to the starting value. The greater the value reported the more significant was the coronary oxygen supply increase.

The procedures were carried out using 15 alert unanesthetized dogs, each weighing between 12 and 16 kg. The procedure of Rayford, Huvos and Gregg, Proc. Soc. exp. Biol. Med. 113, 876 [1963] were followed, catheters having been implanted surgically into the Sinus coronarius, the aorta and the vena cava of the animals. It was thus made possible to photometrically determine the coronary arteriovenous saturation difference (Brinkman, Arch. Chir. Neerl. 1, 177 [1949]) and from the actual hemoglobin values obtained to convert the values into the corresponding volume percents. The compounds were administered intravenously in the amounts indicated in 1 ml. of a 5 percent Lutrol-9-solution (liquid polyethylene oxide, molecular weight about 400, BASF-Ludwigshafen) in 5.5 percent aqueous glucose.

The following compounds were employed in the experimental procedures:

(A) N(6)-methyl-adenosine
(B) N(6)-benzyl-adenosine
(C) N(6)-(2-phenyl-cyclopropyl)-adenosine
(D) N(6)-(2-phenyl-cyclohexyl)-adenosine
(E) N(6)-(2-phenyl-cyclopentyl)-adenosine
(F) N(6)-(2-phenoxy-cyclopropyl)-adenosine
(G) N(6)-(trans-2-phenyl-cyclohexyl)-adenosine
(H) N(6)-(trans-2-phenyl-cyclopentyl)-adenosine The results of the experimental procedures are set out in the following table:

TABLE

| Compound | Doses, mg./kg. I.V. | Decrease of the coronary $O_2$ depletion (at maximum effect) in volume percent as compared to the controls. |
|---|---|---|
| A | 2.0 | <0.5 |
| B | 0.4 | 2.5 |
| C | 0.4 | 3.6 |
| D | 0.2 | 6.3 |
| E | 0.1 | 7.2 |
| F | 0.4 | 7.7 |
| G | 0.2 | 11.4 |
| H | 0.2 | 7.4 |

From the table, it can be seen that the compounds, in accordance with the invention, constitute highly valuable therapeutic agents having marked coronary dilating properties in contrast to the known compound N(6)-methyl-adenosine which is substantially ineffective until a dosage range of 2.0 mg./kg. is reached. The known compound N(6)-benzyl-adenosine is as seen from the table effective at a dosage range of 0.4 mg./kg. to increase the supply of oxygen to the heart.

However, as previously indicated, the adenosine derivatives of this invention are readily adapted to therapeutic use as cardio and circulatory agents. All of the compounds in accordance with the invention are superior in effectiveness to the known compounds. The toxicity of the compounds of the invention has been found to be quite low or substantially non-existent when they are administered in amounts that are sufficient to achieve the desired therapeutic effects. Moreover, no other pharmacological side effects have been observed to occur as a result of their administration.

In accordance with the method of treatment of the present invention, the compounds can be given via the oral route. However, the compounds can also be administered as parenterals in the form of their solutions or suspensions. The compounds can be administered either alone and/or preferably in combination with a pharmaceutically acceptable carrier, and such administration can be carried out in both single and multiple dosages. More particularly, the compounds of this invention can be administered in a wide variety of different dosage forms wherein they are combined with various pharmaceutically acceptable inert carriers in the form of tablets, capsules, dragees, powders, aqueous suspensions, solutions, and the like. Such carriers include solid diluents or fillers, liquid aqueous media and various non-toxic organic solvents, etc. In general, the therapeutically effective compounds are present in such dosage forms at concentration levels ranging from about 0.01 to about 90% by weight of the total composition, i.e., in amounts which are sufficient to provide the desired unit dosage.

In dosage unit form, the compounds as set out herein are used in amounts of from 0.1–50 mg., preferably the compositions are compounded so that for parenteral administration, 0.5–5 mg., of active compound/dosage unit is present and for oral administration 2–10 mg. of compound/dosage unit.

In the case of the N(6)-methyl-adenosine the degree is remarkable. As compared to the N(6)-benzyl-adenosine, the least effective of the compounds of the invention is 44% more effective. As can be seen from the table, with ½ to ¼ of the dose level employed in connection with the N(6)-benzyl-adenosine, a three to five fold increase in the desired effect is achieved.

What is claimed is:

1. An adenosine derivative of the formula:

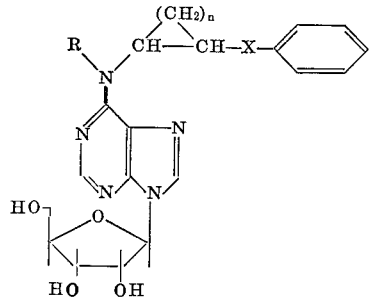

wherein R is a member selected from the group consisting of hydrogen and lower alkyl, X is a valency bond or an oxygen atom and $n$ is a whole number having a value of 1 to 5.

2. An adenosine derivative according to claim 1 designated N(6)-(2-phenyl-cyclopropyl)-adenosine.

3. An adenosine derivative according to claim 1 designated N(6)-(2-phenoxy-cyclopropyl)-adenosine.

4. An adenosine derivative according to claim 1 designated N(6)-(2-phenyl-cyclohexyl)-adenosine having a melting point of 103–105° C.

5. An adenosine derivative according to claim 1 designated N(6)-(2-phenyl-cyclopentyl)-adenosine having a melting point of 102–104° C.

6. An adenosine derivative according to claim 1 designated N(6)-(trans-2-phenyl-cyclohexyl)-adenosine having a melting point of 138–140° C.

7. An adenosine derivative according to claim 1 designated N(6)-(trans-2-phenyl-cyclopentyl)-adenosine having a melting point of 118–120° C.

References Cited

UNITED STATES PATENTS 3,014,900  12/1961  Schroeder _____ 260—211.5
3,133,912  5/1964  Kimming et al. _____ 260—211.5

LEWIS GOTTS, Primary Examiner

J. R. BROWN, Assistant Examiner

U.S. Cl. X.R.
424—180